United States Patent [19]

Hwa et al.

[11] 4,255,259
[45] Mar. 10, 1981

[54] SCALE INHIBITION

[75] Inventors: Chih M. Hwa, Palatine; Dionisio G. Cuisia, Chicago, both of Ill.

[73] Assignee: Chemed Corporation, Cincinnati, Ohio

[21] Appl. No.: 76,810

[22] Filed: Sep. 18, 1979

Related U.S. Application Data

[63] Continuation-in-part of Ser. No. 915,713, Jun. 15, 1978, abandoned.

[51] Int. Cl.³ .............................................. C02F 5/14
[52] U.S. Cl. .................................. 210/699; 252/180; 210/700
[58] Field of Search ........................... 210/54, 58, 59; 252/180, 181

[56] References Cited

U.S. PATENT DOCUMENTS

| | | | |
|---|---|---|---|
| 3,072,618 | 1/1963 | Turbak | 525/340 |
| 3,289,734 | 12/1966 | Robertson | 159/47 WL |
| 3,630,937 | 12/1971 | Baum et al. | 210/58 |
| 3,715,307 | 2/1973 | Johnson et al. | 210/58 |
| 3,890,228 | 6/1975 | Hwa et al. | 252/180 |
| 4,048,066 | 9/1977 | Cuisia et al. | 210/58 |
| 4,118,318 | 10/1978 | Welder et al. | 210/58 |

FOREIGN PATENT DOCUMENTS 845937 12/1976 Belgium .
1534596 12/1978 United Kingdom .

Primary Examiner—Peter A. Hruskoci
Attorney, Agent, or Firm—Charles L. Harness

[57] ABSTRACT

This invention relates to an improved method for inhibiting deposition of scale in aqueous systems. More specifically, it relates to the use of small quantities of an improved composition for preventing formation of scale and sludge deposits in steam generating boilers. The composition is characterized by the fact that by using a plurality of selected ingredients a synergistic effect is obtained. The ingredients comprise a copolymer of styrene sulfonic acid and maleic anhydride or maleic acid, along with a water soluble organophosphonic acid compound.

9 Claims, No Drawings

SCALE INHIBITION

This is a continuation-in-part of our copending application Ser. No. 915,713, filed June 15, 1978, now abandoned, the contents of which are incorporated herein by reference.

The formation of scale and sludge deposits on heating surfaces is the most serious problem encountered in boiler operations. External softening partially removes from the boiler feedwater those scale-forming substances. To combat the scale-forming tendency of entrained impurities, such as calcium and magnesium salts, and iron, internal chemical treatment is applied in boiler water in most industrial boilers. The chemical treatment of boiler water generally involves the combined use of a precipitating agent and a sludge conditioner to maintain the boiler sludge in a fluid form. The precipitating chemicals commonly employed for calcium salts are soda ash and the sodium phosphates, e.g., disodium phosphate, trisodium phosphate, and sodium metaphosphate. Magnesium is precipitated by the alkalinity of the boiler water as magnesium hydroxide. The precipitate or sludge, which is made non-sticky and easily manageable by the addition of a sludge conditioner, is removed from the boiler through the blowdown.

Up to the present, tannins, lignins, starches, polyacrylates and polymethacrylates were used as sludge conditioners. However, their results have not been completely satisfactory. Several patents have been found which listed serious attempts to overcome these problems, but all of these are characterized by individual difficulty. For instance, in U.S. Pat. No. 4,048,066 to Cuisia et al issued Sept. 13, 1977, a composition has been discussed as being helpful, namely, copolymer of styrene sulfonic acid with another polymerizable monoethylenic compound, such as maleic acid. Likewise in U.S. Pat. No. 3,671,448, to Kowalski, issued June 20, 1972, a disclosure is made of the use of hydroxyethylidene diphosphonic acid. This patent refers to the use of this particular compound in the treatment of scale inhibition and is used in combination with other non-pertinent components, thus forming a two-component system.

U.S. Pat. Nos. 3,297,578 to Crutchfield et al issued Jan. 10, 1967, and 3,634,257, issued to Porter on Jan. 11, 1972, are directed to detergent compositions or incrustation inhibiting agents wherein hydroxyethylene diphosphonic acid has been used.

U.S. Pat. No. 3,289,734 issued to Robertson on Dec. 6, 1966 discloses a scale inhibiting process using a certain styrene maleic anhydride copolymer. U.S. Pat. No. 4,118,318 issued to Welder et al on Oct. 3, 1978, discloses the use of phosphonates as scale inhibitors in gas scrubbers.

The following patents refer to similar compositions for inhibiting scale formation but are more remote U.S. Pat. Nos.: 3,276,998, 3,650,970, 3,706,717 and 3,723,333.

While no complete solution to the problem has been found in the prior art, we have been fortunate in discovering an improved sludge conditioning composition based upon the synergistic action of a multi-component system, which satisfactorily controls and prevents the occurrence of scale in a steam generating boiler.

The principal object of this invention therefore is an improved method for inhibiting deposition of scale in aqueous systems. A further object is the use of small quantities of ingredients which are synergistic in nature for the prevention of the formation of scale or sludge deposits in steam generating boilers.

Other objects will be appreciated from the following description of the invention.

The present invention uses a composition for preventing and controlling scale, said composition comprising a copolymer of styrene sulphonic acid with maleic anhydride or maleic acid, and a water soluble organophosphonic acid compound having a carbon to phosphorus bond. Their water soluble salts can be used alternatively.

The invention and the synergistic effects of the components can be better appreciated from the following examples:

PROCEDURE

The subject sludge conditioning evaluation was carried out in a small laboratory boiler having three removable tubes. Two of the tubes were heated; one was unheated. At the completion of a test, an unheated boiler tube was removed from the boiler, the scale or deposit present on 6 inches of the central length of the tube was removed (by scraping), collected in a tared vial and weighed. When scaling tests are run using given feedwater and boiler conditions both without boiler sludge conditioning reagent present in the boiler water and with varying dosages of a given boiler water sludge conditioning reagent present, information is obtained as to how well the given reagent or reagents prevent scale deposition and also a comparison of conditioning effectiveness of the subject reagents. The small laboratory boiler used has been described previously in the proceedings of the Fifteenth Annual Water Conference, Engineers Society of Western Pennsylvania, pages 87–102 (1954).

The boiler feedwater for the subject boiler water sludge conditioning on phosphate cycle was prepared by diluting Lake Zurich, Illinois, tap water with distilled water to 40 ppm total hardness as $CaCO_3$, followed by adjustment to a 6 to 1 elemental calcium to magnesium ratio using calcium chloride. The above boiler feed was fed to the boilers together with chemical treatment solutions (containing sodium sulfate, sodium sulfite, sodium hydroxide, sodium chloride, treatment agents consisting of phosphate and sludge conditioning reagents except in blank runs) in a ratio of 3 volumes of feedwater to 1 volume of chemical treatment solution, giving a feedwater total hardness of 30 ppm as $CaCO_3$.

All scaling tests, whether boiler water sludge conditioning reagent was present or absent (blank), were carried out in fixed manner as described as follows: Boiler blowdown was adjusted to 10% of the boiler feedwater, giving approximately 10 concentrations of the boiler water salines. Using the feedwater described in the previous paragraph, the composition of the chemical treatment solution was adjusted to give a boiler water (after the 10 concentrations) of the following composition:

TABLE 1

| | | | |
|---|---|---|---|
| Sodium Hydroxide | as NaOH | | 258 ppm |
| Sodium Carbonate | as $Na_2CO_3$ | | 120 ppm |
| Sodium Chloride | as NaCl | | 681 ppm |
| Sodium Sulfite | as $Na_2SO_3$ | | 50 ppm |
| Sodium Sulfate | as $Na_2SO_4$ | | 819 ppm |
| Silica | as $SiO_2$ | less than | 1 ppm |
| Iron | as Fe | less than | 1 ppm |
| Phosphate | as $PO_4$ | | 10–20 ppm |

All scaling tests were run for 45 hours each at a boiler pressure of 220 psig.

The boiler water sludge conditioning properties of the synergistic mixture of copolymer of styrene sulfonic acid and maleic anhydride and organophosphonic acid at 2 ppm in the feedwater are illustrated by the following non-limiting examples:

EXAMPLE 1

TABLE 2

| Run No. | Additive | Amount of Scale Formed, in Grams | Scale Reduction, % |
|---|---|---|---|
| 1 | Blank (No additive) | 0.686 | None |
| 2 | Copolymer of styrene sulfonic acid and maleic anhydride (3:1 by wt.) having a mol. wt. of 4,000 (I) | 0.090 | 86.9 |
| 3 | Copolymer of styrene sulfonic acid and maleic anhydride (2:1 by wt.) having a mol. wt. of 2,000 (II) | 0.500 | 27.1 |
| 4 | Hydroxyethylidene diphosphonic acid (III) | 0.094 | 86.3 |
| 5 | Nitrilo tri (methylene phosphonic acid) (IV) | 0.366 | 46.6 |
| 6 | N-Carboxymethyl imino di (methylene phosphonic acid) (V) | 0.513 | 25.2 |
| 7 | N, N-Bis (carboxymethyl) amino methylene phosphonic acid (VI) | 0.411 | 40.1 |
| 8 | I + IV (3:1) | 0.030 | 95.6 |
| 9 | II + III (1:3) | 0.090 | 86.9 |
| 10 | II + IV (3:1) | 0.220 | 67.9 |
| 11 | II + V (4:1) | 0.050 | 92.7 |
| 12 | II + VI (4:1) | 0.150 | 78.1 |
| 13 | I + III (1:1) | 0.000 | 100.0 |

EXAMPLE 2

The experimental procedure is the same as that described in Example 1 except that a heated boiler tube was removed from the boiler at the completion of a test for measuring the degree of scale reduction.

TABLE 3

| Run No. | Additive | Scaling Rate, gm/ft2/hr | Scale Reduction, % |
|---|---|---|---|
| 14 | Blank (No Aditive) | 0.094 | — |
| 15 | II | 0.005 | 94.7 |
| 16 | V | 0.015 | 84.0 |
| 17 | II + V (4:1) | 0.000 | 100.0 |

EXAMPLE 3

Experiments were conducted for in-service cleaning of boilers with high-iron scale. The laboratory boiler was first operated for 24 hours to build scale on the heating tubes. It was operated on the phosphate cycle using a feedwater containing 45 ppm (as $CaCO_3$) total hardness and 10 ppm (as Fe) of ferric chloride. In 24 hours, the average boiler scale produced on the 6-inch center portion of the three heaters was 4.64 grams of hydroxyapatite with a large amount of iron. After the prescaling, the laboratory boiler test was continued for 45 hours using a low hardness feedwater (0.6 ppm as $CaCO_3$ total hardness) and 5 ppm of the treatment additive being tested. No phosphate and iron were added. The experimental results are tabulated below.

TABLE 4

| Run No. | Additive | Amount of Scale Formed (or Removed) in Grams | Scale Reduction, |
|---|---|---|---|
| 18 | Blank (No additive) | 0.02 | None |
| 19 | Copolymer of styrene sulfonic acid and maleic anhydride (3:1 by wt.) having a mol. wt. of 4,000 (I) | (0.27) | 5.8 |
| 20 | Hydroxyethylidene diphosphonic acid (III) | (0.15) | 3.2 |
| 21 | I + III(1:1) | (0.90) | 19.4 |

As shown in the above tables, the synergistic effect of the copolymer of styrene sulfonic acid and maleic anhydride and organophosphonic acid compound in scale control is evident. The results are surprising and indeed unexpected.

It is our information and belief that the following compositions according to this invention would show similar unexpected scale reductions when tested by the Procedure above described.

EXAMPLE 4

Copolymer of sodium styrene sulfonate and maleic anhydride (9:1 by wt.) having a molecular weight of 500,000 90% and nitrilo tri(methylene phosphonic acid) 10%.

EXAMPLE 5

Copolymer of potassium styrene sulfonate and maleic anhydride (1:5 by wt.) having a molecular weight of 1,200 35% and ethylenediamine tetra(methylene phosphonic acid) 65%.

EXAMPLE 6

Copolymer of styrene sulfonic acid and maleic acid (2:1 by wt.) having a molecular weight of 6,000 80% and hydroxypropylidene diphosphonic acid 20%.

EXAMPLE 7

Copolymer of ammonium styrene sulfonate and maleic anhydride (1:15 by wt.) having a molecular weight of 2,000,000 15% and potassium salt of hydroxyethylidene diphosphonic acid 85%.

EXAMPLE 8

Copolymer of sodium styrene sulfonate and sodium maleate (1:2 by wt.) having a molecular weight of 15,000 10% and hexamethylenediamine tetra(methylene phosphonic acid) 90%.

EXAMPLE 9

Copolymer of styrene sulfonic acid and maleic anhydride (20:1 by wt.) having a molecular weight of 2,000 75% and sodium salt of diethylenetriamine penta(methylene phosphonic acid) 25%.

EXAMPLE 10

Copolymer of sodium styrene sulfonate and maleic anhydride (1:1 by wt.) having a molecular weight of 250,000 20% and aminoethylidene diphosphonic acid 80%.

EXAMPLE 11

Copolymer of styrene sulfonic acid and maleic anhydride (8:1 by wt.) having a molecular weight of 9,000 8% and hydroxyethylidene diphosphonic acid 92%.

EXAMPLE 12

Copolymer of styrene sulfonic acid and maleic anhydride (4:1 by wt.) having a molecular weight of 50,000 70% and n-butyl amino di(ethyl phosphonic acid) 30%.

EXAMPLE 13

Copolymer of styrene sulfonic acid and maleic acid (3:1 by wt.) having a molecular weight of 3,000 55% and isopropyl phosphonic acid 45%.

EXAMPLE 14

Copolymer of potassium styrene sulfonate and maleic anhydride (1:8 by wt.) having a molecular weight of 250,000 40% and 2-phosphono butane tricarboxylic acid-1,2,4 60%.

EXAMPLE 15

Copolymer of styrene sulfonic acid and maleic anhydride (1:2 by wt.) having a molecular weight of 5,000 68%, 2-aminoethyl phosphonic acid 32%.

EXAMPLE 16

Copolymer of styrene sulfonic acid and maleic anhydride (5:1 by wt.) having a molecular weight of 2,500 40%, sodium salt of tetraethylenepentamine hepta(methylene phosphonic acid) 60%.

EXAMPLE 17

Copolymer of styrene sulfonic acid and maleic anhydride (1:9 by weight) having a molecular weight of 700,000 25% and methylene diphosphonic acid 75%.

EXAMPLE 18

Copolymer of styrene sulfonic acid and maleic acid (6:1 by weight) having a molecular weight of 3,000 50% and hydroxyethylidene diphosphonic acid 50%.

Copolymers of styrene sulfonic acid and maleic anhydride are well known and are available commercially. They can be made by the general process of reacting the copolymer of styrene and maleic anhydride dissolved in an inert, organic solvent such as methylene chloride or dichloroethane with a sulfur trioxide-organic phosphorous compound adduct. The resultant copolymer of styrene sulfonic acid and maleic anhydride being insoluble in the organic solvent precipitates from the solution dropping to the bottom of the reactor. A process for sulfonating the copolymer of styrene and maleic anhydride employing sulfur trioxide-organic phosphorous compound adduct is described in U.S. Pat. No. 3,072,618.

The copolymers of principal interest in this invention have molecular weights in the range of about 800 to 7,000,000, preferably about 1500 to 6000, and more preferably about 2000-4000. The styrene sulfonic acid moiety is suitably about 2 to 98% by weight, preferably about 50 to 95%, and more preferably about 67-90%, of the copolymer. The weight ratio of copolymer to phosphonic acid is suitably about 0.1-10:1, and preferably about 0.3-4:1. More preferably it is 0.5-1.5:1.

In use, concentrations of the additive build up in the boiler water to levels about ten times those in the feed waters. Thus, feed concentrations of about 2 ppm (see Table 3) and 5 ppm (see Table 4) will build up to about 20 and 50 ppm respectively in the boiler. A suitable concentration in the boiler is about 0.2-50 ppm, and preferably about 20 ppm. A broad range, whether for feed water or boiler water, is about 0.01-500 ppm of additive.

Table 5 recaps the foregoing ranges.

TABLE 5

| | Broad Range | Preferred Range | More Preferred Range |
|---|---|---|---|
| Concentration of components in the aqueous system, ppm | 0.01–500 | 0.2–50 | 20 |
| Styrene sulfonic acid moiety in copolymer, wt. % | 2–98 | 50–95 | 67–90 |
| Copolymer mol. wt. (Weight average) | 800–7,000,000 | 1500–6000 | 2000–4000 |
| Copolymer:phosphonic acid wt. ratio | 0.1–10:1 | 0.3–4:1 | 0.5–1.5:1 |

When the copolymer is prepared with maleic anhydride, the anhydride moiety hydrolyzes fairly rapidly when exposed to water, e.g., in a boiler system. In fact, in a preferred embodiment, the copolymer is made up using maleic anhydride, then the composition is dissolved in water for sale as an aqueous solution. In the latter form, the anhydride moiety hydrolyzes to the maleic acid form.

It will be appreciated that many modifications may be made without departing from the scope of the synergistic action of this invention. We intend to be limited, therefore, only by the following Patent Claims:

We claim:

1. Method of inhibiting scale in a boiler water system comprising maintaining in said system about 0.2–50 ppm of a composition which consists essentially of (a) a member selected of the group consisting of copolymers of styrene sulfonic acid and maleic anhydride or maleic acid, and water soluble salts of said copolymers, the styrene sulfonic acid moiety in said copolymer being about 50–95 wt. % and the molecular weight of the copolymers being about 1500–6000 and (b) a member selected from a group consisting of a water soluble phosphonic acid and its water soluble salts; the weight ratio of copolymer to phosphonic acid being about 0.3–4:1.

2. Method according to claim 1 in which the moiety is about 67–90%.

3. Method according to claim 1 in which the molecular weight is about 2000–4000.

4. Method according to claim 1 in which the weight ratio of copolymer to phosphonic acid is about 0.5–5:1.

5. Method according to any one of claims 1, 2, 3, or 4 in which the phosphonic acid is selected from the group consisting of hydroxyethylidene diphosphonic acid, nitrilo tri(methylene phosphonic acid), N-carboxymethyl imino di(methylene phosphonic acid), N,N-bis(carboxymethyl) amino methylene phosphonic acid, ethylene diamine tetra(methylene phosphonic acid), hydroxypropylidene diphosphonic acid, hexamethylenediamine tetra (methylene phosphonic acid), diethylenetriamine penta(methylene phosphonic acid), aminoethylidene diphosphonic acid, n-butyl amino di(ethyl phosphonic acid), isopropyl phosphonic acid, 2-phosphono butane tricarboxylic acid-1,2,4, 2-aminoethyl phosphonic acid, sodium salt of tetraethylenepentamine hepta(methylene phosphonic acid), and methylene diphosphonic acid.

6. Method of inhibiting scale in a boiler water system comprising maintaining in said system about 0.2 to 50 ppm of a composition which consists essentially of (a) a member selected of the group consisting of copolymers of styrene sulfonic acid and maleic anhydride, and water soluble salts of said copolymers, the styrene sulfonic acid moiety in said copolymer being about 67–90% and the molecular weight of the copolymers being about 2000–4000; and (b) a member selected from a group consisting of hydroxyethylidene diphosphonic acid and its water soluble salts; the weight ratio of copolymer to hydroxyethylidene phosphonic acid being about 0.3–4:1.

7. Method according to any one of claims 1, 2, 3, 4, or 6 in which the composition is maintained in the aqueous system at a level of about 20 ppm.

8. Method according to any one of claims 1, 2, 3, 4, or 6 in which the maleic component in the copolymer is maleic anhydride.

9. Method according to any one of claims 1, 2, 3, 4, or 6 in which the maleic component in the copolymer is maleic acid.

* * * * *